United States Patent [19]

Taniguchi et al.

[11] Patent Number: 5,451,672
[45] Date of Patent: Sep. 19, 1995

[54] PROCESS FOR PRODUCING CELLULOSE ACETATE

[75] Inventors: Hiroki Taniguchi; Yoshiaki Kaino; Ryota Iwata, all of Hyogo, Japan

[73] Assignee: Daicel Chemical Industries, Ltd., Osaka, Japan

[21] Appl. No.: 135,329

[22] Filed: Oct. 12, 1993

Related U.S. Application Data

[63] Continuation of Ser. No. 904,444, Jun. 25, 1992, abandoned.

[30] Foreign Application Priority Data

Jul. 2, 1991 [JP] Japan ................. 3-161579

[51] Int. Cl.⁶ ................. C08B 1/02; C08B 3/06; C08B 3/24; B27J 7/00
[52] U.S. Cl. ................. 536/70; 536/76; 536/124; 241/21; 241/28
[58] Field of Search ................. 536/70, 71, 72, 73, 536/74, 75, 76, 77, 124; 241/28, 21

[56] References Cited

U.S. PATENT DOCUMENTS

| | | | |
|---|---|---|---|
| 1,851,008 | 3/1932 | Hanson | 536/70 |
| 2,105,498 | 1/1938 | Barrett et al. | 536/70 |
| 2,415,949 | 12/1944 | Holloway et al. | 536/70 |
| 2,552,190 | 5/1951 | Lackey et al. | 536/70 |
| 4,336,370 | 6/1982 | Yasnovsky et al. | 536/71 |
| 4,439,605 | 3/1984 | Yabune et al. | 536/71 |
| 5,036,900 | 8/1991 | Burley et al. | 536/70 |

FOREIGN PATENT DOCUMENTS 0351226 1/1990 European Pat. Off. .
1514788 6/1978 United Kingdom .

*Primary Examiner*—Jeffrey Mullis
*Attorney, Agent, or Firm*—Flynn, Thiel, Boutell & Tanis

[57] ABSTRACT

A process for producing cellulose acetate from a hard, low-grade pulp sheet having a high sheet density on an industrial scale without impairing the acetylation reactivity of the pulp, characterized in that a pulp sheet having a sheet density of at least 0.5 g/cm³ is used as the cellulose material and the pulp sheet is disintegrated while feeding less than 40 parts by weight, based on 100 parts by weight (in terms of oven-dry weight) of the pulp sheet, of water into the disintegrating section of a disintegrator in the step of disintegrating the material. The present process is economically advantageous because the drying and humidity controlling steps are simplified due to the quantity of water to be fed being small.

2 Claims, No Drawings

PROCESS FOR PRODUCING CELLULOSE ACETATE

This application is a continuation of U.S. Ser. No. 07/904,444, filed Jun. 25, 1992, now abandoned.

BACKGROUND OF THE INVENTION

1. Field of the Invention

The present invention relates to a process for producing cellulose acetate. In particular, the present invention relates to a process for producing cellulose acetate which is particularly useful when a low-grade wood pulp sheet having a high sheet density is employed as a starting material. The disintegration is conducted in the presence of a small amount of water fed into the disintegrating section of a disintegrator during the step of disintegrating the starting pulp sheet.

2. Description of the Related Art

Cellulose acetate is an organic acid ester of cellulose and is used for various purposes such as the material of fibers for clothes, cigarette filters, chips plastics, films and paints. The production of cellulose acetate is the largest of the cellulose derivatives. Cellulose acetate is thus industrially important.

A typical example of the processes for producing secondary cellulose acetate on an Industrial scale is the so-called acetic acid process wherein acetic anhydride is used as an acetylating agent, acetic acid is used as a diluent and sulfuric acid is used as a catalyst.

The acetic acid process for producing cellulose acetate is outlined as follows: this process comprises (1) a pretreatment and activation step wherein a cellulose material having a relatively high α-cellulose content is disaggregated and disintegrated, and acetic acid, which may contain a small amount of an acid catalyst, is sprayed thereon and mixed therewith, (2) an acetylation step wherein the activated cellulose obtained in step (1) is treated with an acid mixture comprising acetic anhydride, acetic acid and an acid catalyst (such as sulfuric acid) to obtain a primary cellulose acetate, (3) an aging step wherein the primary cellulose acetate is hydrolyzed to obtain a secondary cellulose acetate having a desired degree of acetylation, and (4) an aftertreatment step wherein the secondary cellulose acetate thus obtained is separated from the reaction solution by precipitation, purified, stabilized and dried.

Techniques of improving the above-described basic steps developed from various viewpoints were proposed. The present invention relates to a process for producing cellulose acetate, especially from a low-grade wood pulp. The techniques proposed heretofore in this technical field will be described below. "A low-grade pulp" has an α-cellulose content of about 98% or below, generally.

It has been known that secondary cellulose acetate having excellent transparency, filterability and spinnability is produced by disintegrating a wood pulp having an α-cellulose content of 92 to 93% in a dilute aqueous acetic acid solution to obtain a slurry and then repeating dehydration and substitution with acetic acid to conduct a so-called slurry pretreatment, preparing the primary cellulose acetate by an ordinary method, completely neutralizing the sulfuric acid catalyst in the reaction system, and saponifying and aging the reaction mixture at 125° to 170° C.

It has also been known that secondary cellulose acetate having excellent transparency, filterability and spinnability is produced by disintegrating a high-grade pulp having a high α-cellulose content by an ordinary dry method, conducting acetylation in the presence of a small amount of sulfuric acid as the catalyst at a high temperature to complete the acetylation in a short time and to obtain primary cellulose acetate, completely neutralizing the sulfuric acid catalyst in the reaction system, and conducting saponification and aging at 110° to 120° C. Even a low-grade pulp having a low α-cellulose content can be used as a starting material in this process.

The above-described processes are characterized in that the saponification and aging are conducted at a high temperature. By the high-temperature saponification and aging, the breakage and change in the shape of acetylated hemicellulose harmful to the properties of cellulose acetate are accelerated to make it harmless.

High-grade pulp having a high α-cellulose content has been used heretofore as the starting cellulose for cellulose acetate.

It is generally conceivable that cellulose materials having a high grade and a reasonable price or cost are not generally available on the market, because of the worldwide limitation of resources and environmental pollution caused by pulp production plants. However, the above-mentioned typical example of processes for producing secondary cellulose acetate on an industrial scale, that is, the so-called acetic acid process, and the process using a high-grade pulp having a high α-cellulose content described above are disadvantageous when a low-grade pulp having a low α-cellulose content is employed as the starting cellulose.

Namely, pulp sheets prepared from the low-grade pulp having a low α-cellulose content are hard because of the essential uses thereof and, therefore, they cannot be disaggregated or disintegrated to an extent suitable for the pretreatment and activation or acetylation in a dry pulp disintegrator widely used in ordinary cellulose acetate producing techniques. As a result, a large amount of unreacted fibers or a gel formed by the incomplete reaction are contained in the acetylation product and, therefore, it cannot be used as the final product.

Although the above-described technique of producing cellulose acetate from a low-grade pulp having a low α-cellulose content is preferred under these circumstances, it still has industrial defects in practice.

Namely, although the above-described problem can be solved by the slurry pretreatment process, a large amount of a dilute aqueous acetic acid solution formed in the step must be concentrated and recovered. It is thus difficult to employ this process for the production on an industrial scale from the economic viewpoint.

European Patent Publication-A2 No. 351226 (published on Jan. 17, 1990) and the corresponding Japanese Patent Laid-Open No. 91101/1990 (published on Mar. 30, 1990) disclose a process wherein a pulp sheet is impregnated with water prior to disintegration to previously soften it so as to prevent the reactivity of the pulp from lowering in the disintegration step. However, in these processes wherein the whole pulp sheet is impregnated with water, a large quantity of water is necessitated and, therefore, the drying cost for removing excess water after the completion of the disintegration is high. Thus, this process cannot be easily employed from the economic viewpoint.

DISCLOSURE OF THE INVENTION

Summary of the Invention

As described above, the conventional techniques have problems when they are employed for the production of cellulose acetate from a low-grade pulp on an industrial scale. An object of the present invention is, therefore, to provide a process for producing cellulose acetate, especially from a low-grade pulp, which can be conducted on an industrial scale.

The present inventors noted the effect of water in the disintegration step and, after extensive investigations made for the purpose of determining the minimum quantity of water necessitated for keeping the acetylation reactivity of the pulp on a level suitable for the production of cellulose acetate on an industrial scale by preventing the reactivity from lowering, the present inventors have found that it is unnecessary to impregnate the whole pulp with water for attaining the object and that only a small quantity of water is necessitated only when the pulp is brought into contact with the disintegrating section of a disintegrator to disintegrate the pulp. The present invention has been completed on the basis of this finding.

Thus the present invention provides a process for producing cellulose acetate by disintegrating a cellulose material, activating it by a pretreatment, converting it into an acetic ester thereof and then saponifying and aging it to form a secondary cellulose acetate, characterized in that a pulp sheet having a sheet density of at least 0.5 g/cm$^3$ is used as the cellulose material and the pulp sheet is disintegrated while feeding less than 40 parts by weight, based on 100 parts by weight (in terms of oven-dry weight) of the pulp sheet, of water into the disintegrating section of a disintegrator in the step of disintegrating the material.

Namely, the present invention provides a process for producing cellulose acetate comprising the steps of disintegrating a cellulose material, activating it by a pretreatment, converting it into an acetic ester thereof and then saponifying and aging it to form a secondary cellulose acetate, wherein a pulp sheet having a sheet density of at least 0.5 g/cm$^3$ is used as the cellulose material and the pulp sheet is disintegrated while feeding less than 40 parts by weight, preferably less than 10 parts by weight, based on 100 parts by weight (in terms of oven-dry weight) of the pulp sheet, of water into the disintegrating section of a disintegrator in the step of disintegrating the material.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In conducting the process of the present invention, a pulp sheet having a sheet density of at least 0.5 g/cm$^3$ is disintegrated on an ordinary dry disintegrator while feeding less than 40 parts by weight, preferably less than 10 parts by weight, based on 100 parts by weight (in terms of oven-dry weight) of the pulp sheet, of water into the disintegrating section of the ordinary dry disintegrator.

The pulp sheet used as the cellulose material in the present invention is not limited provide that the sheet has a sheet density of at least 0.5 g/cm$^3$. Examples thereof include a pulp sheet from a coniferous tree, a pulp sheet from a broadleaf tree and the like.

The dry disintegrator used in the present invention include attrition mill, pin mill, hammer mill and cutter mill. The term "disintegrating section" herein indicate, for example, a section of a disintegrating disc to be brought into contact with the pulp, in the disintegration step, in an attrition mill; a pin part to be brought into contact with the pulp, in the disintegration step, in a pin mill; or a hammer or cutter to be brought into contact with the pulp, in the disintegration step, in a hammer mill or cutter mill.

Water can be fed in the form of a mist with a shower nozzle or ultrasonic humidifier or, alternatively, a necessitated quantity of water can be directly fed to the disintegrating section of the disintegrator by an ingenious means. The water feeding method can be suitably selected depending on the disintegrator to be used. As for the feeding rate of water, it is necessary that the disintegrating section is always wet and care should be taken so that the water supply does not stop for a long time. Although the object can be attained by feeding water strictly into only the disintegrating section of the disintegrator, water can be applied also to the pulp and around the disintegrating section so far as the total quantity of water is less than 40 parts by weight based on 100 parts by weight (in terms of oven-dry weight) of the pulp sheet. When the quantity of water is more than 40 parts by weight, the cost for removing excess water by drying after the disintegration is high, which is economically unsuitable. Although the lower limit of the quantity of water to be fed is not given, it is about 0.01 part by weight based on 100 parts by weight (in terms of oven-dry weight) of the pulp sheet. A surfactant or a softener may be added to the water used for disintegration.

The pulp thus disintegrated is dried or the water content thereof is adjusted by an ordinary method, if necessary, to obtain a fluffy disintegrated pulp.

The disintegrated pulp obtained is then activated by a pretreatment wherein preferably 20 to 100 parts (by weight; the same shall apply hereinafter) of glacial acetic acid is sprayed on 100 parts of the disintegrated pulp and the pulp is stirred in a closed vessel with a stirrer at a temperature of 30° to 50° C. for 0.5 to 2 hours.

Then, for example, a mixture of 200 to 400 parts, based on 100 parts of the disintegrated pulp, of acetic anhydride, 0 to 350 parts, based on 100 parts of the disintegrated pulp, of glacial acetic acid (when glacial acetic acid is employed as acetic acid) and 0.5 to 5 parts, based on 100 parts of the disintegrated pulp, of an acidic catalyst is added thereto and stirred to obtain a mixture. Heat is generated by the reaction is controlled so that the temperature is elevated substantially at a constant rate to the final temperature of 50° to 85° C. in 20 to 60 minutes. The reaction mixture is maintained at this temperature for 3 to 20 minutes to acetylate cellulose to thereby obtain primary cellulose acetate.

The primary cellulose acetate is then saponified and aged. The acid catalyst in the reaction mixture of primary cellulose acetate is neutralized and then steam is blown into the reaction system under pressure to adjust the temperature of the reaction system to preferably 125° to 170° C. The system is preferably maintained at this temperature for 3 minutes to 6 hours. Thus, primary cellulose acetate is hydrolyzed to form secondary cellulose acetate having a desired degree of acetylation.

The secondary cellulose acetate reaction mixture is thrown into a dilute aqueous acetic acid solution to form precipitates, which are recovered, washed, purified and dried.

By using the pulp sheet having a sheet density of at least 0.5 g/cm³ as the cellulose material and disintegrating this material while a small quantity of water is fed into the disintegrating section of an ordinary dry disintegrator in the disintegration step in the production of cellulose acetate, the quantity of water necessitated for preventing a lowering in the reactivity of the disintegrated pulp can be minimized and, therefore, the costs of the drying and moisture control can be reduced. Thus, the disintegration can be easily conducted on an industrial scale.

By the process of the present invention for producing cellulose acetate, secondary cellulose acetate having excellent transparency, filterability and spinnability can be easily produced on an industrial scale from a hard low-grade pulp having a high sheet density which could not be used in conventional dry disintegrating processes by using water in a quantity far smaller than that used in the conventional processes.

EXAMPLES

The following Examples will further illustrate the present invention, which by no means limit the invention.

In the Examples, parts and percentages are given by weight.

The density of the starting pulp sheet was determined according to JIS P-8118-1976.

The properties of cellulose acetate were determined by the following methods:

Degree of acetylation: ASTM D-871 (1970)

Viscosity : the sample was dissolved in a 96% aqueous acetone solution to obtain a solution having a cellulose concentration of 20%. The time (sec.) required for a steel ball (diameter: 6.32 mm, weight: 1.043 g) to fall for a distance of 10 cm in a tube having an inner diameter of 25.9 mm and filled with the cellulose acetate solution was determined.

Degree of filtration: a 20% solution of cellulose acetate in a 96% aqueous acetone solution was filtered through a given filter cloth at 50° C. under a predetermined pressure and the quantity of the filtrate was determined. The degree of filtration kw was calculated according to the following formula:

$$kw = \frac{2 - P_2/P_1}{P_1 + P_2} \times 10^4$$

wherein:

$P_1$ represents the quantity (ml) of the filtrate obtained in 20 minutes from the initiation of the filtration, and $P_2$ represents the quantity (ml) of the filtrate obtained in 40 minutes (from 20 to 60 minutes after the initiation of the filtration).

The degree of filtration, which can be calculated according to the above formula, indicates the degree of clogging of the filter cloth. Namely, the degree of filtration indicates the amount of insoluble matters in the solution of cellulose acetate in acetone. Cellulose acetate having a low filterability is supposed to have a high insoluble matter content. Therefore, when cellulose acetate having a low filterability is used, the spinning nozzle will be clogged as a matter of course and the frequency of end breakage will be increased, so that the spinnability of such a cellulose acetate will be poor. The spinnability was therefore evaluated by the results of the determination of the filterability.

The term "excellent spinnability" herein refers to the state wherein the maximum spinning velocity, draft ratio and frequency of end breakage are each within the range of predetermines reference values.

EXAMPLES 1 TO 6

Each of the pulp sheets listed in Table 1 was disintegrated on an attrition mill while feeding 0.5 part, based on 100 parts (in terms of oven-dry weight) of the pulp sheet, of water with an ultrasonic humidifier in Example 1, 5 parts of water in Example 2, 9.8 parts of water in Example 3, 20 parts of water in Examples 4 and 5, and 30 parts of water in Example 6 by the showering method into the disintegrating section of the mill. After disintegration, the water content of each of the disintegrated pulps thus obtained was adjusted to 5.0%. Secondary cellulose acetate was produced from the disintegrated pulp having a water content of 5.0% by a method which will be described below.

The disintegrated pulp having a water content of 5.0% was placed in a pretreatment apparatus. 100 parts of glacial acetic acid was uniformly sprayed on 100 parts of the pulp having a water content of 5% and mixed therewith at 40° C. for 30 minutes to activate the pulp by the pretreatment. A liquid mixture of 250 parts, based on 100 parts of the pulp having a water content of 5%, of acetic anhydride, 375 parts, based on 100 parts of the pulp having a water content of 5%, of acetic acid and 1.0 part, based on 100 parts of the pulp having a water content of 5%, of sulfuric acid, previously cooled to 12° C., was placed in an acetylation apparatus of the kneading type. The pulp activated by the pretreatment as described above was introduced thereinto and stirred to obtain a mixture. The temperature of the mixture was elevated by the heat generated by the reaction of water entrained by the starting pulp with acetic anhydride and the reaction of cellulose with acetic anhydride. The temperature elevation was controlled by external cooling so that it would be elevated to 77° C. from the initial temperature (about 16° C.) during 60 minutes. Then, the temperature was maintained at 77° C. for additional 12 minutes to conduct acetylation.

Then, 10 parts of a 20% aqueous magnesium acetate solution was mixed therein to completely neutralize sulfuric acid in the reaction system and to leave excess magnesium acetate. The completely neutralized reaction mixture was transferred into an autoclave, which was then closed and steam of a gauge pressure of 5 kg/cm³ was blown thereinto under stirring to elevate the temperature to 150° C. during about 60 minutes. The temperature was maintained at 150° C. for 50 minutes and the reaction product was slowly flashed under atmospheric pressure to lower the temperature of the reaction mixture to 100° C. A dilute aqueous acetic acid solution was added to the reaction mixture under vigorous stirring to form cellulose acetate in the form of flakes, which were separated, thoroughly washed with water, taken out and dried.

The degree of acetylation, viscosity and degree of filtration of the flaky cellulose acetate thus obtained are as given in Table 1, which indicates that secondary cellulose acetate having an excellent filterability, namely, excellent spinnability, is obtained.

COMPARATIVE EXAMPLES 1 TO 6

The same pulp sheets as those used in the Examples 1 to 6 were disintegrated by the dry method without using any water in the attrition mill. The pulps thus disintegrated were treated in the same manner as that described above to obtain secondary cellulose acetate.

The degree of acetylation, viscosity and filterability of the obtained secondary cellulose acetate are given in Table 1 in comparison with those obtained in the Examples 1 to 6. It will be apparent that secondary cellulose acetate thus obtained had only a poor filterability or spinnability.

TABLE 1

|  |  | Example No. or Comp. Ex. No. | | | | | |
| --- | --- | --- | --- | --- | --- | --- | --- |
|  |  | 1 | 2 | 3 | 4 | 5 | 6 |
| Starting pulp sheet | tree | coniferous tree | coniferous tree | coniferous tree | broadleaf tree | coniferous tree | broadleaf tree |
|  | digestion method | sulfite method | kraft method | sulfite method | kraft method | sulfite method | sulfite method |
|  | α-cellulose content (%) | 96.0 | 97.4 | 93.3 | 94.0 | 92.3 | 91.3 |
|  | sheet density (g/cm$^3$) | 0.55 | 0.63 | 0.68 | 0.76 | 0.87 | 0.90 |
| Ex. | degree of acetylation (%) | 55.3 | 55.4 | 55.2 | 55.4 | 55.4 | 55.2 |
|  | viscosity (sec) | 19 | 20 | 19 | 18 | 20 | 19 |
|  | filterability | 150 | 120 | 110 | 130 | 150 | 120 |
| Comp. Ex. | degree of acetylation (%) | 55.1 | 55.0 | 55.3 | 55.5 | 55.1 | 55.1 |
|  | viscosity (sec) | 18 | 19 | 20 | 20 | 18 | 19 |
|  | filterability | 420 | 650 | 960 | 1050 | 800 | 760 |

As described above, secondary cellulose acetate having excellent filterability or spinnability can be obtained by using only a small quantity of water on an industrial scale according to the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claimed is:

1. A process for producing cellulose acetate wherein water is added in the process only in the disintegrating section of a disintegrator consisting essentially of the steps of:

providing a cellulosic material consisting of pulp sheet having a sheet density of at least 0.5 g/cm$^3$;

introducing the cellulosic material into a disintegrating section of a disintegrator;

subjecting the cellulosic material to disintegration while feeding from 0.5 to less than 10 parts by weight, based on 100 parts by weight of oven-dry pulp sheet, of water to the disintegrating section;

activating the disintegrated cellulosic material;

converting the activated cellulosic material into an acetic ester thereof; and saponifying and aging the acetic ester to produce secondary cellulose acetate.

2. A process for producing cellulose acetate wherein water is added in the process only in the disintegrating section of a disintegrator consisting of the steps of:

providing a cellulosic material consisting of pulp sheet having a sheet density of at least 0.5 g/cm$^3$;

introducing the cellulosic material into a disintegrating section of a disintegrator;

subjecting the cellulosic material to disintegration while feeding from 0.5 to less than 10 parts by weight, based on 100 parts by weight of oven-dry pulp sheet, of water to the disintegrating section;

activating the disintegrated cellulosic material;

converting the activated cellulosic material into an acetic ester thereof; and saponifying and aging the acetic ester to produce secondary cellulose acetate.

* * * * *